(12) United States Patent
Roux

(10) Patent No.: US 7,428,713 B1
(45) Date of Patent: Sep. 23, 2008

(54) ACCELERATED DESIGN OPTIMIZATION

(75) Inventor: Willem J. Roux, Livermore, CA (US)

(73) Assignee: Livermore Software Technology Corp., Livermore, CA (US)

( * ) Notice: Subject to any disclaimer, the term of this patent is extended or adjusted under 35 U.S.C. 154(b) by 288 days.

(21) Appl. No.: 11/456,309

(22) Filed: Jul. 10, 2006

(51) Int. Cl.
*G06F 17/50* (2006.01)

(52) U.S. Cl. .............................. 716/2; 716/1

(58) Field of Classification Search .............. 716/1, 716/2

See application file for complete search history.

(56) References Cited

U.S. PATENT DOCUMENTS

| 7,173,966 | B2 * | 2/2007 | Miller | 375/229 |
| 2006/0058985 | A1 * | 3/2006 | Arslan et al. | 703/2 |
| 2006/0212279 | A1 * | 9/2006 | Goldberg et al. | 703/2 |

* cited by examiner

*Primary Examiner*—Sun J Lin
(74) *Attorney, Agent, or Firm*—Roger H. Chu

(57) ABSTRACT

A system, method, and software product for an accelerated design optimization is described. Engineers/designers/users define an initial design with a set of responses and constraints on the responses in a design optimization process. A plurality of approximations to the responses around the initial design is created to represent an engineering design space. A current optimal design is determined from the approximations subject to the set of constraints. Actual structural response of the current optimal design is calculated. As a result, the residual between the actual response and the approximated response can be established. When the optimization process has not reached convergence, another set of approximations is created around the current optimal design. Instead of using the original set of constraints, the new set of constraints is adjusted with the calculated residual, so that the design optimization process can achieve convergence much faster.

22 Claims, 8 Drawing Sheets

ACCELERATED DESIGN OPTIMIZATION

BACKGROUND

1. Field of the Invention

The present invention generally relates to a method, system and software product used in the area of computer-aided engineering design and analysis, more particularly to an accelerated design optimization method.

2. Description of the Related Art

In the conventional design approach, an engineering design is improved by evaluating its response (e.g., computer aided engineering analysis result) and making design modifications based on experience or intuition. The drawback of the conventional approach is that the final design may not always be the "best" design, since the design objectives are sometimes in conflict. Also it is not very clear how to modify the design to achieve the best compromise of these objectives. A more systematic approach is then used to alleviate the drawback: the design criteria and variables are defined first before a "best" design is computed or achieved. The procedure by which the design variables are modified to obtain the best design satisfying the design criteria is referred to as design optimization.

Today, there are a number of methodologies used in the field of design optimization including, but not limited to, response surface methodology, Taylor series expansion, neural nets, Kriging approximations, stochastic Monte Carlo simulations, and alike. However, there are a couple of problems associated with the design optimization approach: 1) it is too slow to achieve the optimal design and 2) the optimal design may not be conservative.

It is therefore desirable to have new improved method and system for accelerating design optimization to obtain an optimal design that is conservative.

SUMMARY

This section is for the purpose of summarizing some aspects of the present invention and to briefly introduce some preferred embodiments. Simplifications or omissions in this section as well as in the abstract and the title herein may be made to avoid obscuring the purpose of the section. Such simplifications or omissions are not intended to limit the scope of the present invention.

The present invention discloses a system, method and software product for accelerating design optimization. According to one aspect, one of the design optimization techniques is to construct a plurality of approximations, whose structural response resembles that of the engineering design of interest. An optimization is then performed amongst the approximations based on a set of pre-determined design constraints or objectives. The new optimal design is compared with the previous one to determine if the convergence has been achieved. If not, this iterative process goes on using a new modified approximation.

According to another aspect, engineers/designers/users define an initial design with a set of responses, an objective, and constraints on the responses in a design optimization process. A plurality of approximations to the responses around the initial design is created to represent an engineering design space. A current optimal design is determined from the approximations considering the objective and subject to the set of constraints. Actual structural response of the current optimal design is calculated. As a result, the residual between the actual response and the value predicted by the approximation can also be established. When the optimization process has not reached convergence, another set of approximations is created around the current optimal design. Instead of using the original set of constraints, the new set of constraints is adjusted with the calculated residual, so that the design optimization process can achieve convergence much faster.

According to yet another aspect, the adjustment of the constraints is only made to those constraints that can lead to a conservative design. This ensures that the final optimal design in the design optimization process is always conservative.

According to one embodiment, the present invention is an accelerated design optimization method. The method includes at least the following: (a) receiving an initial optimal design, a set of structural responses, a set of constraints on some of the responses, and an objective referring to one of the responses; (b) creating a set of approximations to the responses around the optimal design and calculating residuals associated with the approximations; (c) modifying the constraints with an adjustment based on the residuals if the responses are non-conservative; (d) determining an optimal design from the approximations based on the objective and the constraints; and (e) repeating (b)-(d) until the optimal design has converged. In another embodiment, the method further includes at least the following: (d1) calculating actual responses of the optimal design; and (d2) calculating an error between the actual responses and approximated responses of the optimal design, wherein said repeating further includes (d1) and (d2) until the optimal design has converged, and the adjustment is based on the calculated error.

One of the objects, features, and advantages of the present invention is not only to faster converge to a final optimal design, but to compute a conservative design in each iteration of a design optimization.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will be better understood with regard to the following description, appended claims, and accompanying drawings as follows:

DESCRIPTION

In the following description, numerous specific details are set forth in order to provide a thorough understanding of the present invention. However, it will become obvious to those skilled in the art that the present invention may be practiced without these specific details. The descriptions and representations herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1A-5B. However, those skilled in the art will readily appreciate that the detailed description given herein with respect to these figures is for explanatory purposes as the invention extends beyond these limited embodiments.

Figure 1A:
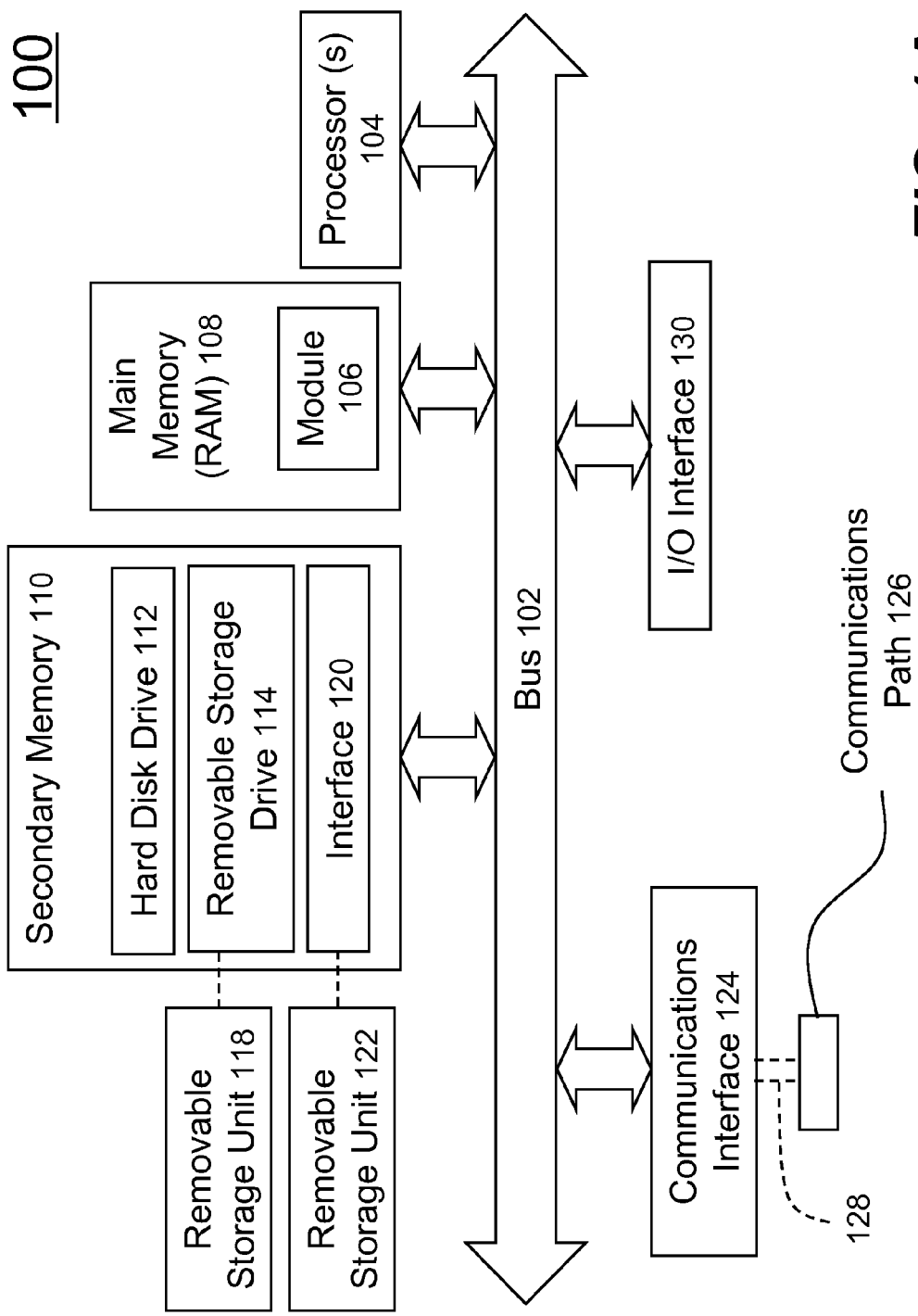
FIG. 1A depicts a block diagram of an exemplary computer, in which one embodiment of the present invention may be implemented.

Referring now to the drawings, in which like numerals refer to like parts throughout several views. The present invention may be implemented using hardware, software or a combination thereof and may be implemented in a computer system or other processing system. In fact, in one embodiment, the invention is directed towards one or more computer systems capable of carrying out the functionality described herein. An example of a computer system 100 is shown in FIG. 1A. The computer system 100 includes one or more processors, such as processor 104. The processor 104 is connected to a computer system internal communication bus 102. Various software embodiments are described in terms of this exemplary computer system. After reading this description, it will become apparent to a person skilled in the relevant art(s) how to implement the invention using other computer systems and/or computer architectures.

Computer system 100 also includes a main memory 108, preferably random access memory (RAM), and may also include a secondary memory 110. The secondary memory 110 may include, for example, one or more hard disk drives 112 and/or one or more removable storage drives 114, representing a floppy disk drive, a magnetic tape drive, an optical disk drive, etc. The removable storage drive 114 reads from and/or writes to a removable storage unit 118 in a well-known manner. Removable storage unit 118, represents a floppy disk, magnetic tape, optical disk, etc. which is read by and written to by removable storage drive 114. As will be appreciated, the removable storage unit 118 includes a computer usable storage medium having stored therein computer software and/or data.

In alternative embodiments, secondary memory 110 may include other similar means for allowing computer programs or other instructions to be loaded into computer system 100. Such means may include, for example, a removable storage unit 122 and an interface 120. Examples of such may include a program cartridge and cartridge interface (such as that found in video game devices), a removable memory chip (such as an EPROM, universal serial bus USB flash memory, or PROM) and associated socket, and other removable storage units 122 and interfaces 120 which allow software and data to be transferred from the removable storage unit 122 to computer system 100. In general, Computer system 100 is controlled and coordinated by operating system (OS) software, which performs tasks such as process scheduling, memory management, networking and I/O services. Exemplary OS includes Linux®, Microsoft Windows®.

There may also be a communications interface 124 connecting to the bus 102. Communications interface 124 allows software and data to be transferred between computer system 100 and external devices. Examples of communications interface 124 may include a modem, a network interface (such as an Ethernet card), a communications port, a PCMCIA slot and card, etc. Software and data transferred via communications interface 124 are in the form of signals 128 which may be electronic, electromagnetic, optical, or other signals capable of being received by communications interface 124. These signals 128 are provided to communications interface 124 via a communications path (i.e., channel) 126. This channel 126 carries signals (or data flows) 128 and may be implemented using wire or cable, fiber optics, a phone line, a cellular phone link, an RF link, a Bluetooth® wireless link and other communications channels.

The channel 126 facilitates a data flow 128 between a data network and the computer 100 and typically executes a special set of rules (i.e., a protocol) to send data back and forth. One of the common protocols is TCP/IP (Transmission Control Protocol/Internet Protocol) commonly used in the Internet. In general, the communication interface 124 manages the assembling of a data file into smaller packets that are transmitted over the data network or reassembles received packets into the original data file. In addition, the communication interface 124 handles the address part of each packet so that it gets to the right destination or intercepts packets destined for the computer 100.

In this document, the terms "computer program medium" and "computer usable medium" are used to generally refer to media such as removable storage drive 114, and a hard disk installed in hard disk drive 112. These computer program products are means for providing software to computer system 100. The invention is directed to such computer program products.

The computer system 100 may also include an I/O interface 130, which provides the computer system 100 to access monitor, keyboard, mouse, printer, scanner, plotter, and alike.

Computer programs (also called computer control logic) are stored as application modules 106 in main memory 108 and/or secondary memory 110. Computer programs may also be received via communications interface 124. Such computer programs, when executed, enable the computer system 100 to perform the features of the present invention as discussed herein. In particular, the computer programs, when executed, enable the processor 104 to perform features of the present invention. Accordingly, such computer programs represent controllers of the computer system 100.

In an embodiment where the invention is implemented using software, the software may be stored in a computer program product and loaded into computer system 100 using removable storage drive 114, hard drive 112, or communications interface 124. The application module 106, when executed by the processor 104, causes the processor 104 to perform the functions of the invention as described herein.

The main memory 108 may be loaded with one or more application modules 106 that can be executed by one or more processors 104 with or without a user input through the I/O interface 130 to achieve desired tasks. In operation, when at least one processor 104 executes one of the application modules 106, the results are computed and stored in the secondary memory 110 (i.e., hard disk drive 112). The status of the design optimization (e.g., an optimal design at a particular iteration of the process) is reported to the user via the I/O interface 130 either in a text or in a graphical representation.

In one embodiment, an application module 106 is configured to facilitate the creation initial design and associated constraints on responses. The module 106 allows the user/design/engineer to define a plurality of approximations and constraints, etc. In another embodiment, an application module 106 is configured to facilitate determining an optimal design amongst the plurality of approximations based on the constraints. In yet another embodiment, an application module 106 is configured to facilitate the calculation of the actual response and residual of an optimal design. In yet still another embodiment, an application module 106 is configured to facilitate the adjustment of the constraints before next iteration in the design optimization process.

Figure 1B:
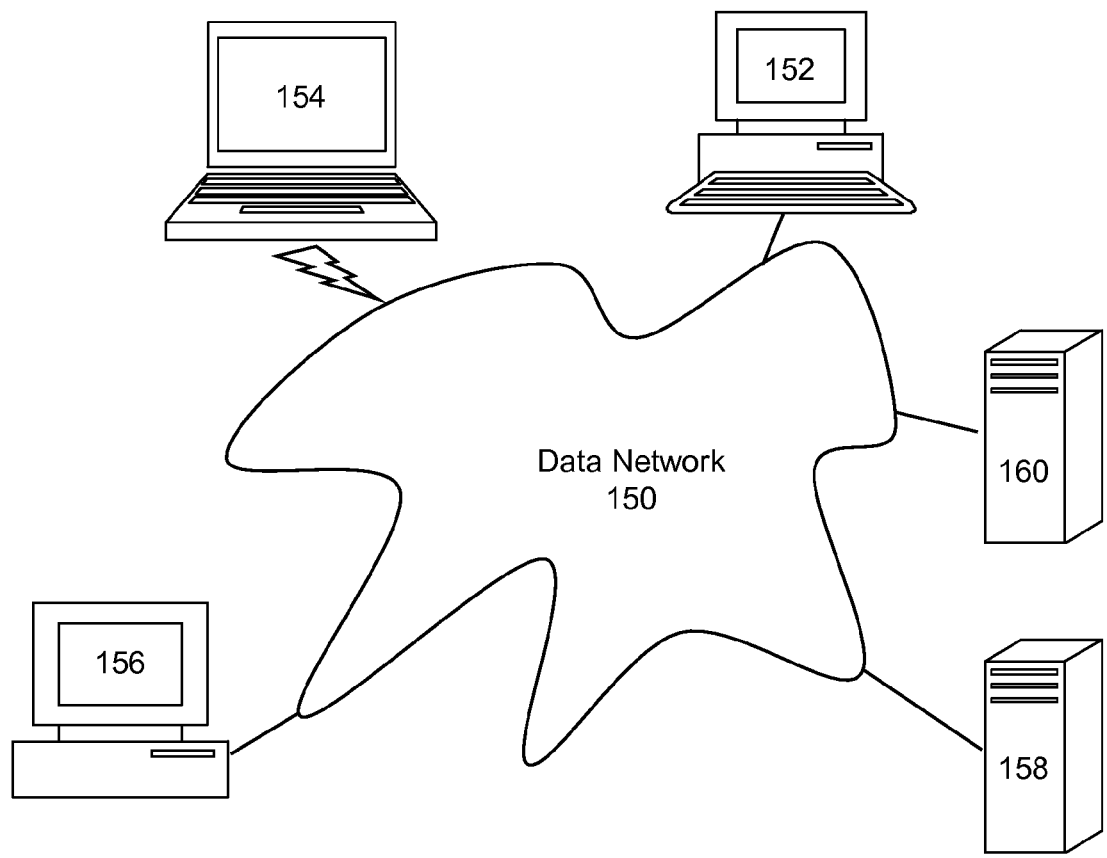
FIG. 1B depicts an exemplary network environment that one embodiment of the present invention may be deployed.

FIG. 1B depicts a networked computing environment 140, in which one embodiment of the present invention may be practiced. A plurality of network capable computing devices 152, 154, 156, 158 and 160 (e.g., the computer device 100 described in FIG. 1A) are coupled to a data network 150. These computing devices 152-160 can communicate with each other via the network 150. The data network 150 may include, but is not limited to, the Internet, an Intranet, local area network (LAN), wide area network (WAN), a wireless network or a data network comprises of public and private networks. In one embodiment, a software module (e.g., 106 in FIG. 1A) for a design optimization may be configured and executed on a computing device 158, while the pre- and post-processing of the simulation are conducted on another computing device 156 by users/designers/engineers. The input file and the output results file are transmitted over the data network 150 between the computing device 158 and the computing device 156. During the execution of the application module, the user may be able to monitor the progress of the analysis at another computing device 154. In another embodiment, the design optimization and pre-/post-processing can be performed in one computing device 152. One exemplary implementation of these techniques is included in a suite of engineering analysis computer software products, LS-PREPOST®, LS-OPT® and LS-DYNA®, offered by Livermore Software Technology Corporation, Livermore, Calif., USA.

Figure 2A:
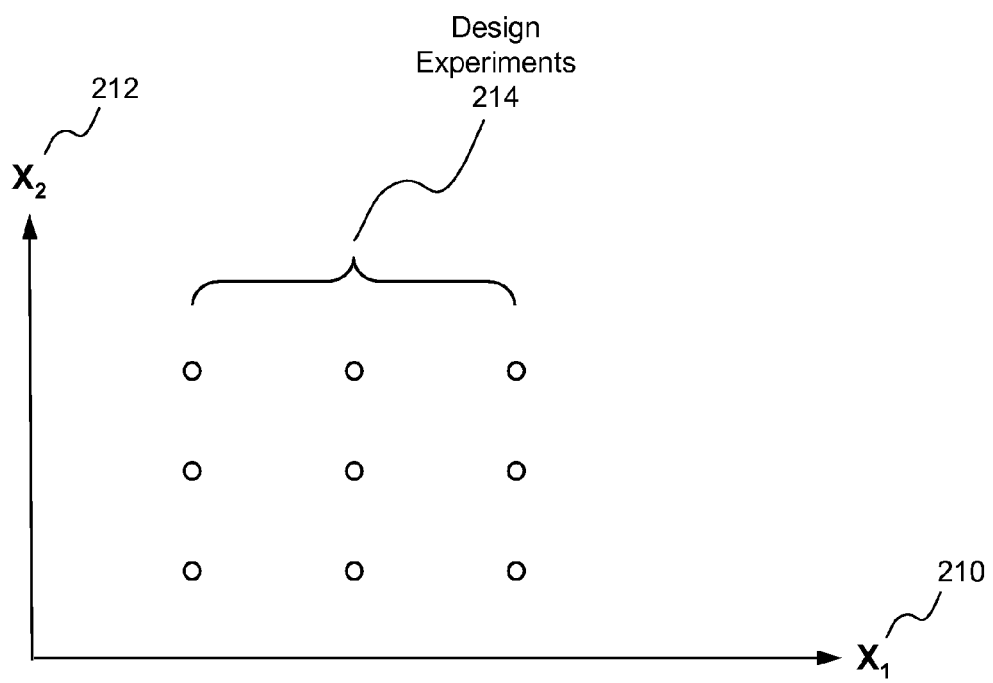
FIG. 2A is a graphical plot illustrating a plurality of design experiments with two design variables in accordance with one embodiment of the present invention.

FIG. 2A shows an exemplary plot 200 of a plurality of design experiments 214 basing on two design variables, $X_1$ 210 and $X_2$ 212 in accordance with one embodiment of the present invention. Each of the design experiments 214 has a specific combination of design variables $X=<X_1, X_2>$ in this case. Although only two design variables are shown in FIG. 2A, the present invention does not have a limit as to the number of design variables. The general form of design variable is as follows: $X=<X_1, X_2, \ldots, X_n>$. In a design optimization, a plurality of design experiments 214, each including a different combination of design variables, is defined first. Then the structural responses for each of the design experiments 214 are obtained. In one embodiment, finite element analysis (FEA) is used for obtaining the structural responses. In another embodiment, a physical model or prototype test is used.

Figure 2B:
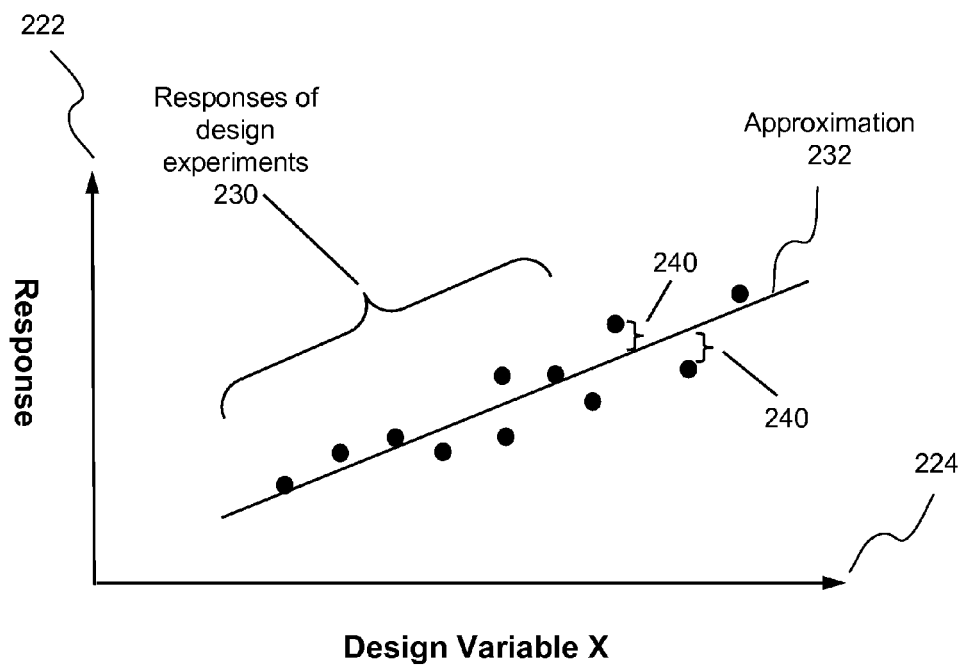
FIG. 2B is a plot showing the structural responses of a set of design experiments in accordance with one embodiment of the present invention.

FIG. 2B is an X-Y plot showing structural responses 230 of a set of design experiments in accordance with one embodiment of the present invention. The X-Y plot 220 has a vertical axis 222 representing the structural responses and a horizontal axis 224 representing design variable X. The plurality of structural responses 230 may represent the FEA analysis results of the set of design experiments (e.g., design experiments 214 of FIG. 2A). In one embodiment, the structural response may be one of the six components of the nodal displacement. In another embodiment, the FEA responses may be acceleration time history. In order to be able to predict the structural responses 230, a meta-model 232 is constructed. In one embodiment, the least squares fitting technique is used for constructing the meta-model, which is then called a response surface. There is a plurality of approximations with each of the approximations approximating a structural response. In a design optimization process, a set of approximations is created in each of the iterations until the design optimization procedure converges. The approximations may not fit exactly to the actual FEA responses resulting in residuals 240—the differences between the values predicted by the approximations 232 and the actual responses 230. According to one embodiment of the present invention, an adjustment based on a statistical value of the residuals 240 is used to adjust either the constraints or the approximated responses.

Figure 3:
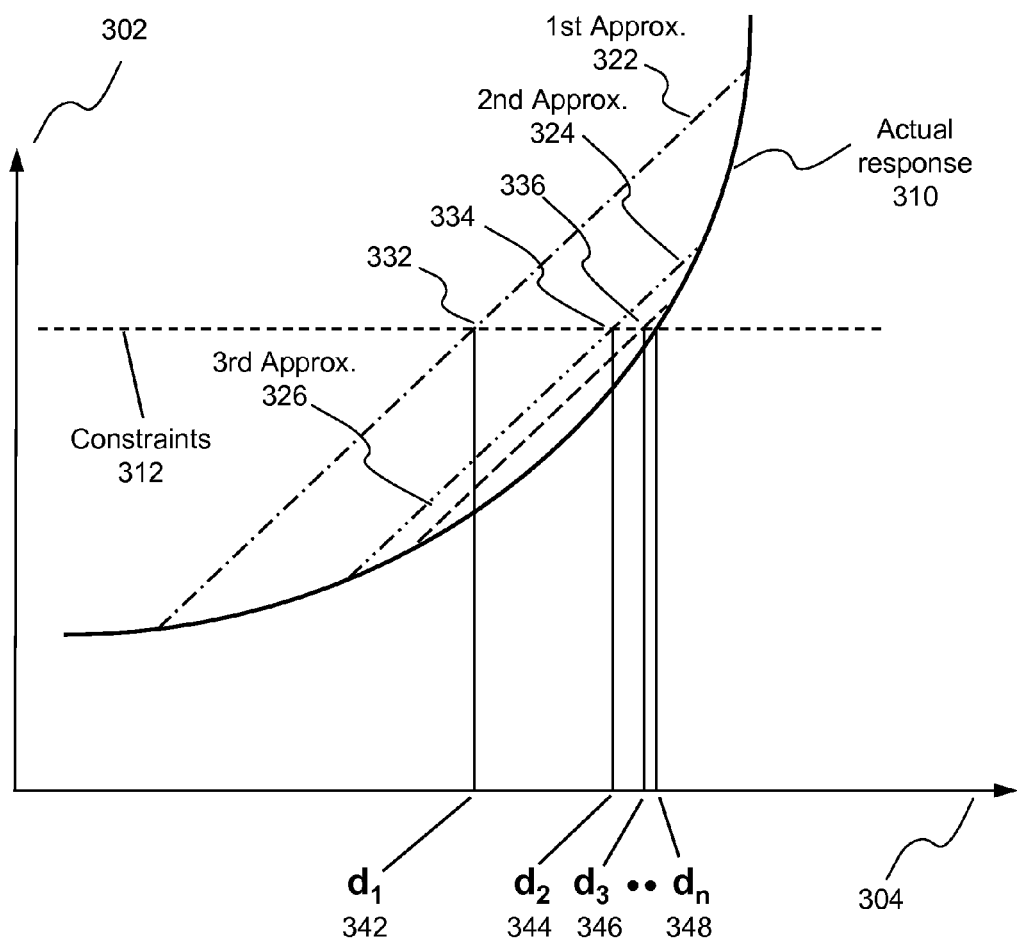
FIG. 3 is a graph illustrating an exemplary design optimization procedure with constant constraints in accordance with one embodiment of the present invention.

FIG. 3 is a graph 300 illustrating an exemplary design optimization procedure with constant constraints in accordance with one embodiment of the present invention. The graph 300 is an X-Y plot with the vertical axis 302 representing a structural response and the horizontal axis horizontal axis 304 representing a design variable specifying various designs. The curve 310 is the actual response of each of the optimal designs in the design space. The line 312 represents a constraint on the response for the design optimization defined by users/designers/engineers. The line 322 represents a first approximation created for estimating the approximate responses. In one embodiment, the first approximation is created by least squared fit of a set of responses from a design experiment as described in FIGS. 2A and 2B. The first optimal design $d_1$ 342 is determined at the intersection 332 between the first approximation 322 and the constraints 312. As the design optimization is an iterative procedure, a second approximation 324 is created to determine the second optimal design $d_2$ 344 using the same set of constraints 312 at the intersection 334. Similarly in the next iteration, the third optimal design $d_3$ 346 is determined at the intersection 336 between the third approximation 326 and the constraint 312. The design optimization process ends when the final optimal design $d_n$ 348 has been reached. This is usually achieved by checking the convergence between two consecutive optimal designs. For example, the difference between two designs is within a pre-determined tolerance.

Figure 4:
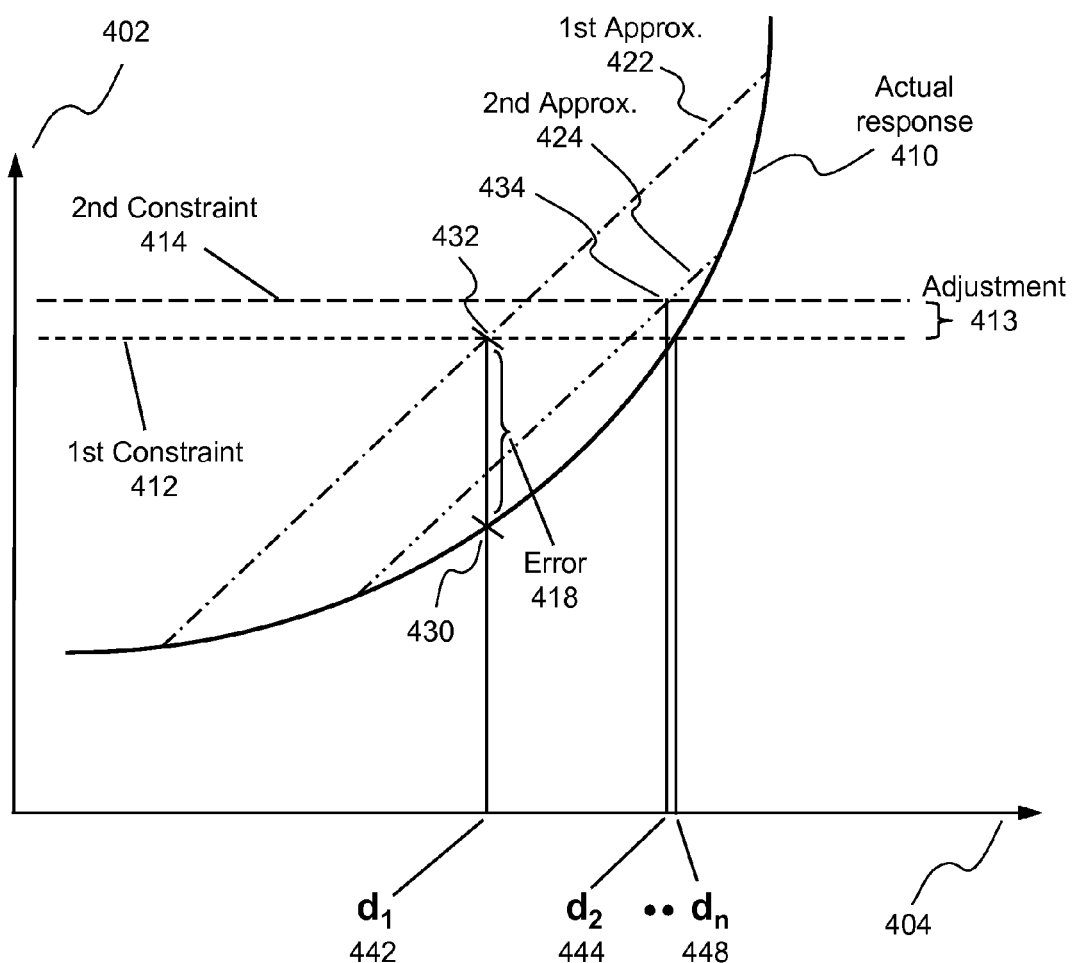
FIG. 4 is a graph illustrating an exemplary design optimization procedure with an adjusted constraint in accordance with one embodiment of the present invention.

FIG. 4 is a graph 400 illustrating an exemplary design optimization procedure with an adjusted constraint in accordance with one embodiment of the present invention. Similar to the graph 300, the graph 400 is an X-Y plot with the vertical axis 402 representing the structural responses and the horizontal axis 404 representing the design space. The curve 410 is the actual structural responses (e.g., an acceleration time history from a FEA analysis). Based on a constraint (i.e., first constraint) represented by the line 412 and the first approximation 422, a first optimal design $d_1$ 442 is determined at the intersection 432 following the same procedure described above with reference to FIG. 3 therein. The actual structural response 430 for the first optimal design $d_1$ 442 can be calculated (e.g., a FEA analysis result, a model test result, a prototype test result, etc.). An error 418 can then be calculated as the difference between the actual response 430 and the approximated response 432 of the first optimal design.

Instead of using constant constraint in the previous procedure, a second constraint 414 is created by modifying the first constraint 412 with an adjustment 413 based on either the calculated error 418 or a particular statistical value of the residuals (e.g., residuals 240 of FIG. 2B) from the current iteration of the design optimization. The exemplary statistical value may include, but not be limited to, the maximum, minimum, or multitude of standard deviation of the residuals of the response surface fit of the current iteration. Using the second constraint 414 and the second approximation 424, a second optimal design $d_2$ 444 is determined at intersection 434. The iterative design optimization procedure ends, when a final optimal design $d_n$ 448 has been reached. Because the adjustment 413 to the constraint incorporates the knowledge obtained through the error 418 between the approximate and the actual responses, or the residuals 240 from the current iteration, the optimal design resulted from the adjusted constraint is generally a design closer to the best possible optimal design. As a result, the design optimization procedure with reference to FIG. 4 converges faster than that to FIG. 3.

The adjustment 413 may be applied to the approximated responses 422, 424 instead of the constraints 412, 414. Due to the complementary nature of these two quantities, the adjustment 413 is made in opposite directions when applied to the constraints or to the approximated responses.

For illustration simplicity, the embodiments described in the paragraphs with respect to FIGS. 3 and 4 include only one design variable, one response, and one constraint. The present invention does not set limit as to how many design variables, responses, or constraints considered in a design optimization procedure. In fact, most of design optimization procedure includes more than one design variable, approximation, constraint, optimal design, and iteration.

Figure 5A:
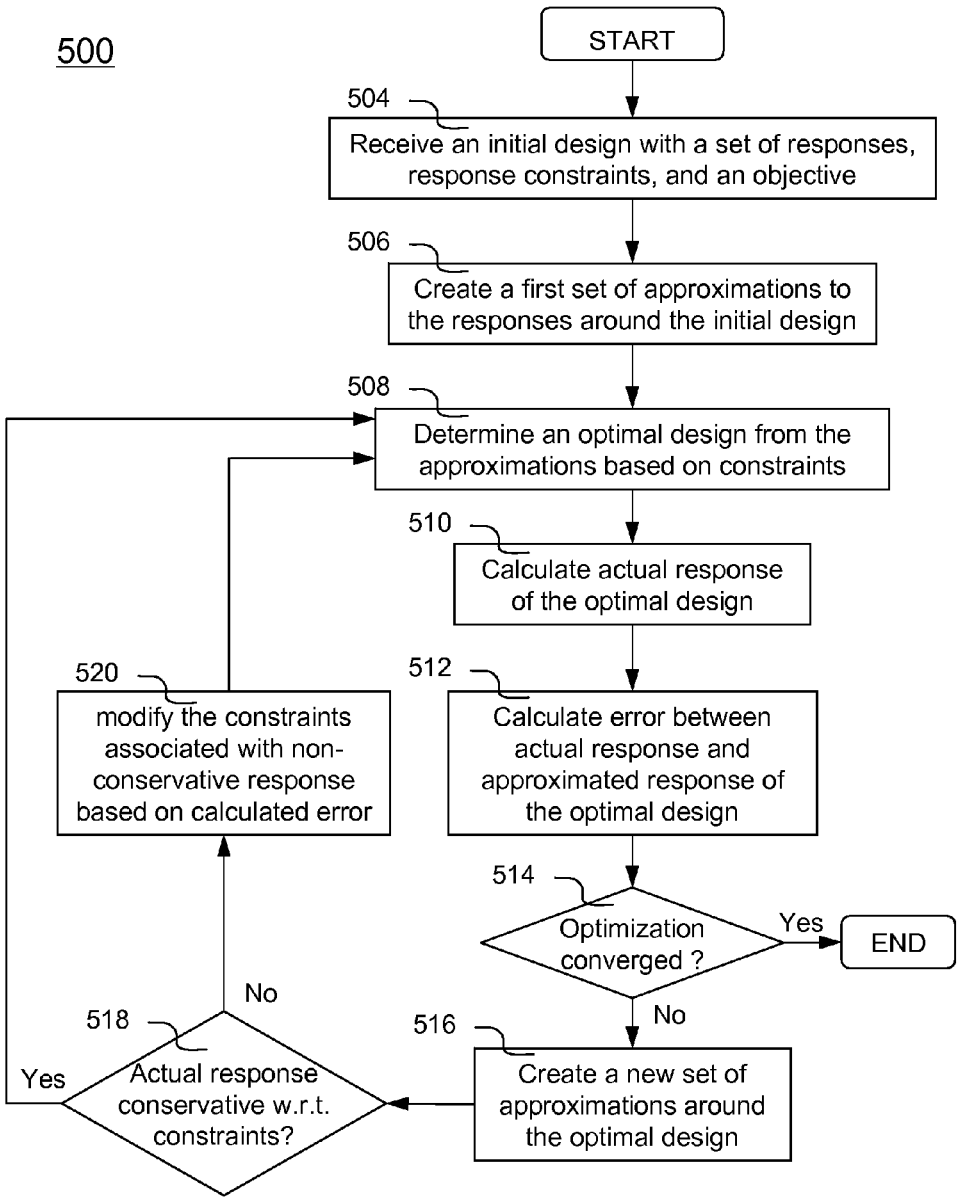
FIG. 5A is a flowchart showing a first process of the accelerated design optimization in accordance with one embodiment of the present invention.

FIG. 5A is a flowchart showing a first process 500 of the accelerated design optimization in accordance with one embodiment of the present invention. The first process 500, which is preferably understood in conjunction with the previous figures, may be implemented in software. At 504, the process 500 receives a set of responses of an initial design experiment, a set of constraints on some of the responses, and an objective referring to one of the responses. The responses, constraints, and objective are defined by users/designers/engineers. The process 500 creates a first set of approximations (i.e., first approximations) around the responses of the initial design experiment, such that the first approximations approximate the response over a range of the design variables around the initial design experiment at 506. In one embodiment, the first approximations are created by using least squares fitting of all of the received responses. In another embodiment, the approximations are a neural net, and in another the approximations are Kriging metamodels. The process 500 then determines an optimal design using the current approximations, the set of constraints, and the objective at 508. At 510, the process 500 calculates the actual response of the optimal design. The error (e.g., the error 418 of FIG. 4) is then calculated between the actual response and the approximated response at 512 for the optimal design. The process 500 moves to a test 514, in which the convergence of the design optimization procedure is checked. When the test 514 is false, the process 500 creates another set of approximations (i.e., second approximations) around the optimal design based on the actual response at 516. The process 500 moves to another test 518 to check if the actual response is conservative with regards to the constraints. If the test 518 is false, the process 500 creates a set of new constraints (i.e., second constraints) by modifying the current constraints associated with the non-conservative response with an adjustment based on the calculated error (i.e., calculated error from 512) at 520. An equivalent adjustment may also be made to the approximated responses in the opposite direction, which produces the same effect as the adjustment to the constraints. The process 500 moves back to 508 to continue the iterative design optimization procedure until the test 514 is true. If the test 518 is true, the process 500 follows the "Yes" branch directly to 508 without any adjustment to the constraints.

Figure 5B:
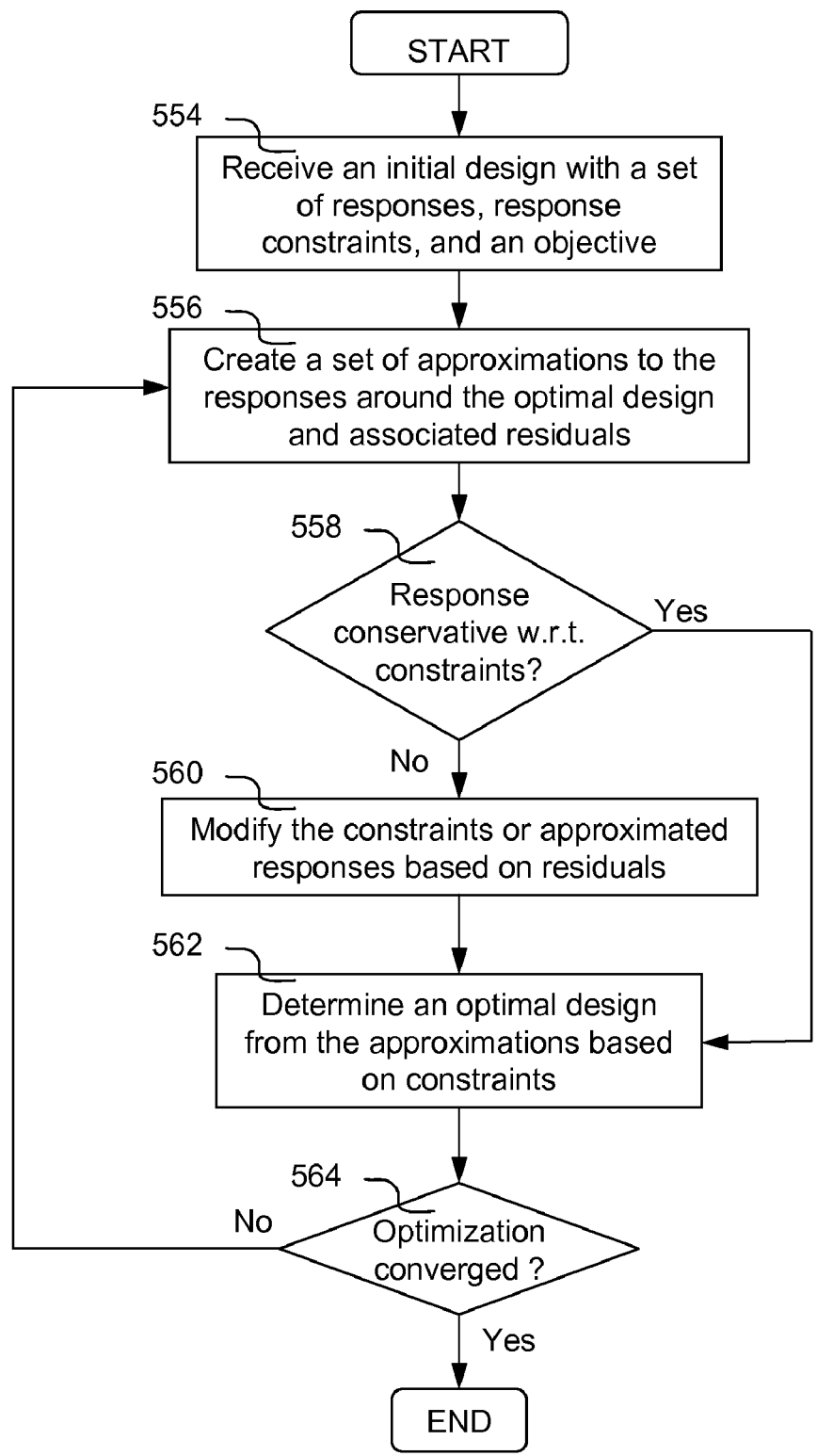
FIG. 5B is a flowchart showing a second process of the accelerated design optimization in accordance with another embodiment of the present invention.

FIG. 5B is a flowchart showing a second process 550 of the accelerated design optimization in accordance with another embodiment of the present invention. Similar to the first process 500, the second process 550 is preferably understood in conjunction with the previous figures, and may be implemented in software. The process 550 starts by receiving a set of responses of an initial design experiment, a set of constraints on some of the responses, and an objective referring to one of the responses at 554. The process 550 creates a first set of approximations (i.e., first approximations) around the responses of the initial design experiment, such that the first approximations approximate the response over a range of the design variables around the initial design experiment at 556. The associated residuals (e.g., residuals 240 defined in FIG. 2B) are also calculated at 556. The process 550 moves to a test 558 to check if the actual responses are conservative with regards to the constraints. If the test 558 is false, the process 550 follows the 'No' branch to 560, at which the process 550 modifies the set of constraints by associated with the non-conservative responses with an adjustment based on a statistical value (e.g., maximum, minimum, standard deviation multitude, etc.) of the calculated residuals. An equivalent adjustment may also be made to the approximated responses in the opposite direction, which produces the same effect as the adjustment to the constraints. If the test 558 is true, the process 550 follows the 'Yes' branch skipping 560. Next at 562, the process 550 determines an optimal design from the current approximations (e.g., the first approximations initially), the current constraints, and the objective. The process 550 moves to a test 564, in which the convergence of the design optimization procedure is checked. When the test 564 is false, the process 550 follows the 'No' branch back to 554 creating another set of approximations and associated residuals and repeating the above described steps until the test 564 has become true—the design optimization has reached a converged optimal design. Therefore, the process 550 ends.

Although an exemplary embodiment of invention has been disclosed, it will be apparent to those skilled in the art that various changes and modifications may be made to achieve the advantage of the invention. It will be obvious to those skilled in the art that some components may be substituted with another component providing the same function. The appended claims cover the present invention.

What is claimed is:

1. An accelerated design optimization method comprising:
  (a) receiving an initial optimal design, a set of structural responses, a set of constraints on some of the structural responses, and an objective referring to one of the structural responses;
  (b) creating a set of approximations to the structural responses around the initial optimal design and calculating residuals associated with the approximations;
  (c) modifying the constraints with an adjustment based on the residuals if the structural responses are non-conservative;
  (d) determining an optimal design from the approximations based on the objective and the constraints; and
  (e) repeating (b)-(d) until the optimal design has converged.

2. The method of claim 1, wherein the initial optimal design and the constraints are defined by engineers or users.

3. The method of claim 1, wherein the structural responses are finite element analysis responses obtained in a design experiment.

4. The method of claim 3, wherein the structural responses are one of i) displacement, ii) velocity and iii) acceleration.

5. The method of claim 1, wherein the structural responses are structural responses obtained in a physical test.

6. The method of claim 1, wherein each of the calculated residuals is a difference between corresponding one of the responses and corresponding one of the approximations.

7. The method of claim 6, wherein the statistical value includes, but is not limited to, maximum, minimum, and standard deviation multitude.

8. The method of claim 6, where the adjustment is done in a conservative direction even if the optimal design is already expected to be conservative with respect to the constraints.

9. The method of claim 1, wherein the adjustment is a statistical value of the residuals.

10. The method of claim 1, wherein the adjustment is applied to approximated responses instead of the constraints in an opposite direction.

11. The method of claim 1, further comprising:
(d1) calculating actual responses of the optimal design;
(d2) calculating an error between the actual responses and approximated responses of the optimal design; and
wherein said repeating further includes (d1) and (d2) until the optimal design has converged.

12. The method of claim 11, wherein the adjustment is based on the calculated error of the optimal design.

13. A computer program product including a computer usable medium having computer readable code embodied in the computer usable medium for causing an application module to execute on a computer for accelerating design optimization, the computer program product comprising:
computer readable code for receiving an initial optimal design, a set of structural responses, a set of constraints on some of the structural responses, and an objective referring to one of the structural responses;
computer readable code for creating a set of approximations to the structural responses around the initial optimal design and for calculating residuals associated with the approximations;
computer readable code for modifying the constraints with an adjustment based on the residuals if the structural responses are non-conservative;
computer readable code for determining an optimal design from the approximations based on the objective and the constraints; and
computer readable code for determining convergence of the design optimization.

14. The computer program product of claim 13, wherein each of the residuals is a difference between corresponding one of the structural responses and corresponding one of the approximations.

15. The computer program product of claim 13, wherein the adjustment is a statistical value of the residuals.

16. The computer program product of claim 13, further comprising:
computer readable code for calculating actual responses of the optimal design; and
computer readable code for calculating an error between the actual responses and approximated responses of the optimal design.

17. The computer program product of claim 13, wherein the adjustment is based on the calculated error of the optimal design.

18. A system for accelerating design optimization, the system comprising:
an I/O interface;
a communication interface;
a secondary memory;
a main memory for storing computer readable code for an application module; and
at least one processor coupled to the main memory, the secondary memory, the I/O interface, and the communication interface, said at least one processor executing the computer readable code in the main memory to cause the application module to perform operations of:
(a) receiving an initial optimal design, a set of structural responses, a set of constraints on some of the structural responses, and an objective referring to one of the structural responses;
(b) creating a set of approximations to the structural responses around the initial optimal design and calculating residuals associated with the approximations;
(c) modifying the constraints with an adjustment based on the residuals if the structural responses are non-conservative;
(d) determining an optimal design from the approximations based on the objective and the constraints; and
(e) repeating (b)-(d) until the optimal design has converged.

19. The system of claim 18, wherein each of the residuals is a difference between corresponding one of the structural responses and corresponding one of the approximations.

20. The system of claim 18, wherein the adjustment is a statistical value of the residuals.

21. The system of claim 18, further comprising:
(d1) calculating actual responses of the optimal design;
(d2) calculating an error between the actual responses and approximated responses of the optimal design; and
wherein said repeating further includes (d1) and (d2) until the optimal design has converged.

22. The system of claim 18, wherein the adjustment is based on the calculated error of the optimal design.

* * * * *